(12) United States Patent
Yamada et al.

(10) Patent No.: US 12,114,624 B2
(45) Date of Patent: Oct. 15, 2024

(54) UTILITY WORK DEVICE

(71) Applicant: KUBOTA CORPORATION, Osaka (JP)

(72) Inventors: Kouhei Yamada, Osaka (JP); Keisuke Igarashi, Osaka (JP); Kazuyuki Tashiro, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 443 days.

(21) Appl. No.: 17/427,118

(22) PCT Filed: Dec. 23, 2019

(86) PCT No.: PCT/JP2019/050283
§ 371 (c)(1),
(2) Date: Jul. 30, 2021

(87) PCT Pub. No.: WO2020/158248
PCT Pub. Date: Aug. 6, 2020

(65) Prior Publication Data
US 2022/0022384 A1    Jan. 27, 2022

(30) Foreign Application Priority Data
Jan. 31, 2019    (JP) ................................ 2019-015957

(51) Int. Cl.
| | |
|---|---|
| *A01G 9/14* | (2006.01) |
| *A01D 46/30* | (2006.01) |
| *A01G 3/00* | (2006.01) |
| *A01G 9/18* | (2006.01) |

(Continued)

(52) U.S. Cl.
CPC ............. *A01G 9/143* (2013.01); *A01D 46/30* (2013.01); *A01G 3/00* (2013.01); *A01G 9/18* (2013.01); *A01M 7/00* (2013.01); *B66C 21/04* (2013.01)

(58) Field of Classification Search
CPC . A01G 9/143; A01G 9/18; A01G 9/24; A01G 3/00; A01D 46/30; A01M 7/00; B66C 21/04; B66C 19/00
See application file for complete search history.

(56) References Cited

U.S. PATENT DOCUMENTS

| | | | |
|---|---|---|---|
| 4,625,938 A | 12/1986 | Brown | |
| 5,295,325 A * | 3/1994 | Honda | ..................... A01G 3/00 |
| | | | 47/1.01 R |
| 2004/0206715 A1 | 10/2004 | Rodnunsky | |

(Continued)

FOREIGN PATENT DOCUMENTS

| | | |
|---|---|---|
| CN | 109258606 A | 1/2019 |
| JP | S63-207343 A | 8/1988 |

(Continued)

OTHER PUBLICATIONS

Official Communication issued in corresponding Chinese Patent Application No. 201980090888.3, mailed on Mar. 16, 2023.

(Continued)

*Primary Examiner* — Glenn F Myers
(74) *Attorney, Agent, or Firm* — Keating & Bennett, LLP

(57) ABSTRACT

A utility work device includes a main body section supported by a support and a working section supported by the main body section to perform a work on an object. The main body section is movable in a horizontal direction and a perpendicular direction.

20 Claims, 4 Drawing Sheets

(51) Int. Cl.
*A01M 7/00* (2006.01)
*B66C 21/04* (2006.01)

(56) References Cited

U.S. PATENT DOCUMENTS

| | | | |
|---|---|---|---|
| 2015/0108319 A1* | 4/2015 | Duncan | A01M 7/00 |
| | | | 248/661 |
| 2018/0235156 A1* | 8/2018 | Blair | A01G 27/003 |
| 2021/0315170 A1* | 10/2021 | Thomas | A01G 9/246 |

FOREIGN PATENT DOCUMENTS

| | | | | |
|---|---|---|---|---|
| JP | 3-19605 | A | | 1/1991 |
| JP | 6125609 | A | * | 5/1994 |
| JP | 3018798 | U | | 9/1995 |
| JP | 11-299364 | A | | 11/1999 |
| JP | 2004-329620 | A | | 11/2004 |
| JP | 2006-223216 | A | | 8/2006 |
| JP | 2010136633 | A | * | 6/2010 |
| JP | 4936362 | B2 | | 5/2012 |
| JP | 2017-195895 | A | | 11/2017 |
| JP | 2018-30559 | A | | 3/2018 |
| JP | 2019-198318 | A | | 11/2019 |
| WO | 2013/072990 | A1 | | 5/2013 |
| WO | 2015/199629 | A1 | | 12/2015 |

OTHER PUBLICATIONS

Official Communication issued in corresponding European Patent Application No. 19913590.6, mailed on May 8, 2023.
Official Communication issued in International Patent Application No. PCT/JP2019/050283, mailed on Mar. 17, 2020.

\* cited by examiner

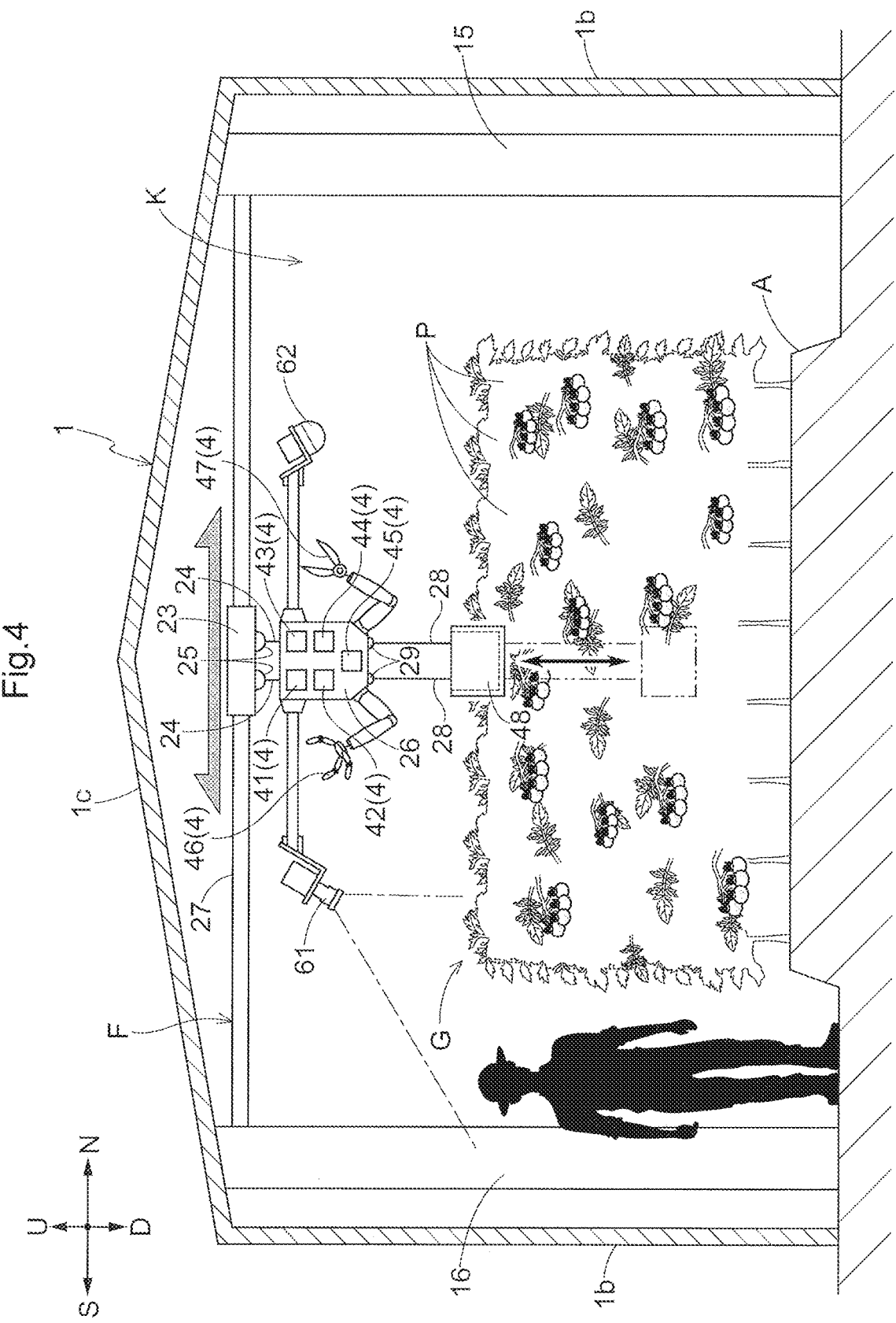

UTILITY WORK DEVICE

BACKGROUND OF THE INVENTION

1. Field of the Invention

The present invention relates to a utility work device including a working section to perform a utility work on an object.

2. Description of the Related Art

An example of such a utility work device is one known from, e.g., Japanese Unexamined Patent Application 2018-30559. This utility work device (disclosed as a "multicoptor" in Japanese Unexamined Patent Application 2018-30559) is configured to be capable of flying with a plurality of rotors. Further, this utility work device can carry out a farming-related utility work with its working section (referred to as an "implement" in Japanese Unexamined Patent Application 2018-30559).

SUMMARY OF THE INVENTION

When the utility work device disclosed in Japanese Unexamined Patent Application 2018-30559 is to carry out a work on an object while flying in a limited space such as a horticultural or agricultural facility, there is a possibility of disturbance or collapse of its flight altitude due to interference on its machine body by a wall, an agricultural produce, etc. It is contemplated that such disturbance or collapse of flight altitude may lead to an inability to accomplish the work appropriately.

Example embodiments of the present invention provide utility work devices that can each easily accomplish an appropriate work in a reliable manner.

According to an example embodiment of the present invention, a utility work device includes a main body section supported by a support, and a working section supported by the main body section to carry out a work on an object, wherein the main body section is movable in a horizontal direction and a perpendicular direction.

With the example embodiment of the present invention described above, the main body section of the utility work device while being supported by the support is movable in the horizontal direction and the perpendicular direction. Thus, even if there occurs interference on the main body section or the working section by a wall or an object, etc., the posture of the main body section will hardly be disturbed.

Therefore, with an example embodiment of the present invention, it is possible to realize a utility work device that can easily accomplish an appropriate work in a reliable manner.

Further, in an example embodiment of the present invention, preferably, the support includes a plurality of wires including a first wire extending in a predetermined direction as seen in a plan view and a second wire extending in a direction intersecting the predetermined direction as seen in the plan view.

With the above-described arrangement, the main body section of the utility work device can move in the horizontal direction and the perpendicular direction, with the main body section being supported by the plurality of wires. As a result, it becomes readily possible to realize reliably a utility work device that can easily accomplish an appropriate work in a reliable manner, through a relatively simple arrangement.

Further, in an example embodiment of the present invention, preferably, the support includes a rail in a horizontal posture.

With the above-described arrangement, the main body section of the utility work device can move in the horizontal direction and the perpendicular direction, with the main body section being supported by the rail in a horizontal posture. With this, it becomes readily possible to realize reliably a utility work device that can easily accomplish an appropriate work in a reliable manner, through a relatively simple arrangement.

Further, in an example embodiment of the present invention, preferably, the rail is capable of supplying electric power to at least either one of the main body section and the working section.

In the case of an arrangement in which the main body section is provided with a battery detachably attached thereto and the utility work device is operated by electric power supplied from such battery, there arises a need to effect a charging operation and a replacing operation of the battery periodically. This will require a relatively large amount of labor for maintenance and operation of the utility work device.

Then, according to the above-described arrangement, it becomes possible to realize a configuration that allows the utility work device to be operated by electric power supplied from the rail. With this, such charging operation and replacing operation of the battery become unnecessary. As a result, it becomes possible to reduce the amount of labor required for maintenance and operation of the utility work device.

Further, in an example embodiment of the present invention, preferably the main body section is supported by the support via a horizontally moving section movable in the horizontal direction, the horizontally moving section suspends the main body section via a suspension, a winding device for winding and unwinding the suspension, as the winding device winds the suspension, the main body section is elevated relative to the horizontally moving section, and as the winding device unwinds the suspension, the main body section is lowered relative to the horizontally moving section.

With the above-described arrangement, in association with a movement of the horizontally moving section in the horizontal direction, the main body section also is moved in the horizontal direction. Further, the main body section can move up/down relative to the horizontally moving section.

With the above arrangement, it becomes possible for the main body section to effect a movement in the horizontal direction and a movement in the perpendicular direction, independently of each other.

Further, in an example embodiment of the present invention, preferably, the working section includes an object information acquirer to acquire information indicative of a state of the object.

With the above-described arrangement, as the main body section and the working section move to a vicinity of an object, it becomes possible to obtain information indicative of a state of the object at a position assumed after the movement. With this, it is possible to obtain information indicative of a state of the object at an appropriate position.

Further, in an example embodiment of the present invention, preferably the object information acquirer includes a camera to photograph the object.

With the above-described arrangement, as the main body section and the working section move to the vicinity of an object, it becomes possible to photograph this object at a position assumed after the movement. With this, it is possible to photograph the object at an appropriate position.

Further, in an example embodiment of the present invention, preferably the working section includes a gripper to grip the object, and there is provided a gripper controller to control the gripper based on an image acquired by the camera.

With the above-described arrangement, it becomes possible to realize a utility work device that automatically grips an object by its gripper based on the image acquired by the camera.

Further, in an example embodiment of the present invention, preferably the working section includes a cutter to cut the object, and there is provided a cutter controller to control the cutter based on the image acquired by the camera.

With the above-described arrangement, it becomes possible to realize a utility work device that automatically cuts an object by its cutter based on the image captured by the camera.

Further, in an example embodiment of the present invention, preferably the working section includes a detector to detect a state of an environment around the object.

With the above-described arrangement, as the main body section and the working section move to the vicinity of an object, it becomes possible to detect a state of an environment around the object at a position assumed after the movement. With this, it is possible to detect a state of the environment around the object at an appropriate position.

Further, in an example embodiment of the present invention, preferably the working section includes an illuminator.

With the above-described arrangement, as the main body section and the working section move to the vicinity of an object, it becomes possible to illuminate the object at a position assumed after the movement. With this, it is possible to irradiate light from an appropriate position.

Further, in an example embodiment of the present invention, preferably the working section includes a carbon dioxide gas generator.

With the above-described arrangement, as the main body section and the working section move to the vicinity of an object, it becomes possible to generate carbon dioxide gas at a position assumed after the movement. With this, it is possible to generate carbon dioxide gas at an appropriate position. Therefore, in case the object is an agricultural product, it is possible to supply the carbon dioxide gas to the agricultural product in an effective manner.

Further, in an example embodiment of the present invention, preferably the working section includes an insect pest controller to control harmful organisms.

With the above-described arrangement, as the main body section and the working section move to the vicinity of an object, it becomes possible to control harmful organisms at a position assumed after the movement. With this, it is possible to control harmful organisms at an appropriate position. Therefore, in case the object is an agricultural product, it is possible to eliminate harmful organisms for the agricultural product in an effective manner.

Further, in an example embodiment of the present invention, preferably the working section includes an accommodating section capable of accommodating the object.

With the above-described arrangement, the main body section of the utility work device can move in the horizontal direction and the perpendicular direction, with the object being accommodated in its accommodating section. With this, it becomes possible for the main body section of the utility work device to transport the object.

Further, in an example embodiment of the present invention, preferably the accommodating section is opened upwards, and the accommodating section is suspended from the main body section and vertically movable relative to the main body section.

With the above-described arrangement, the accommodating section can be moved vertically, in accordance with the size of the object or an amount of object accommodated in the accommodating section already. With this, it becomes readily possible to accommodate an object in the accommodating section. Further, it becomes also readily possible to take the object out of the accommodating section.

Further, in an example embodiment of the present invention, preferably there is provided a physical condition information acquirer supported by the main body section to acquire information indicative of a physical condition of a worker present around the main body section.

With the above-described arrangement, in case a work is to be carried out by the utility work device in cooperation with a worker, it becomes possible to monitor the physical condition of this worker, while carrying out the work.

Further, in an example embodiment of the present invention, preferably the support is provided in a space surrounded by a roof and a wall, the main body section is movable in the horizontal direction and the perpendicular direction within the space, and there is provided an environment information acquirer supported by the main body section to acquire information indicative of the environment inside the space.

With the above-described arrangement, it is possible to realize a utility work device that can monitor the environment inside the space while carrying out a utility work.

According to a further aspect of an example embodiment of the present invention, there is provided a horticultural/agricultural facility including the utility work device described above, wherein the object includes a cultivated plant, there are provided a plurality of groups of plants juxtaposed with a predetermined interval therebetween, and each of the plurality of groups of plants includes a plurality of the cultivated plants and extends in a direction different from the juxtaposing direction of the plurality of the plant groups.

With the above-described configuration, it is possible to realize a horticultural/agricultural facility that can readily carry out an appropriate work on respective cultivated plants in the plurality of plant groups as objects.

Further, in an example embodiment of the present invention, preferably, there is provided a horticultural/agricultural facility including the utility work device described above, wherein the object includes a cultivated plant, there are provided a plurality of groups of plants juxtaposed with a predetermined interval therebetween in the extending direction of the first wire as seen in a plan view, and each of the plurality of groups of plants includes a plurality of the cultivated plants and extends in the extending direction of the second wire as in seen in the plan view.

With the above-described configuration, as the utility work device moves along the first wire, the device can move to the space between two adjacent plant groups. Thereafter, as the utility work device moves along the second wire, the device can move along the extending direction of the plant groups. Therefore, the utility work device carries out a work while moving along the second wire, so that there can be readily obtained improved work efficiency for the respective cultivated plants.

Further, in an example embodiment of the present invention, preferably the cultivated plant is transplanted to grow in an approximately perpendicular direction.

With the above-described arrangement, compared with an arrangement of the cultivated plant being transplanted to grow in the horizontal direction, there can be readily obtained a size reduction for a land required for growth of the cultivated plant. Consequently, the production cost of the cultivated plant can reduced easily.

Moreover, with the above-described arrangement, even in case a high-place work is required due to growth of the cultivated plant, such high-place work can be readily carried out appropriately by the utility work device.

Thus, with the above-described arrangement, it is possible to realize a horticultural/agricultural facility that allows a high-place work to be readily carried out appropriately while reducing the production cost of the cultivated plant.

Further, in an example embodiment of the present invention, preferably, the predetermined interval is greater than a width of the main body section in the juxtaposing direction of the plurality of plant groups.

With the above-described arrangement, it is readily possible to avoid a situation of the main body section of the utility work device interfering with the plant group when the main body section of the utility work device passes through between mutually adjacent two plant groups. With this, the movement of the main body section can be made smooth easily.

The above and other elements, features, steps, characteristics and advantages of the present invention will become more apparent from the following detailed description of the example embodiments with reference to the attached drawings.

BRIEF DESCRIPTION OF THE DRAWINGS

FIG. 4 is a view showing a configuration of a utility work device according to first alternative example embodiment of the present invention.

DETAILED DESCRIPTION OF THE EXAMPLE EMBODIMENTS

Figure 1:
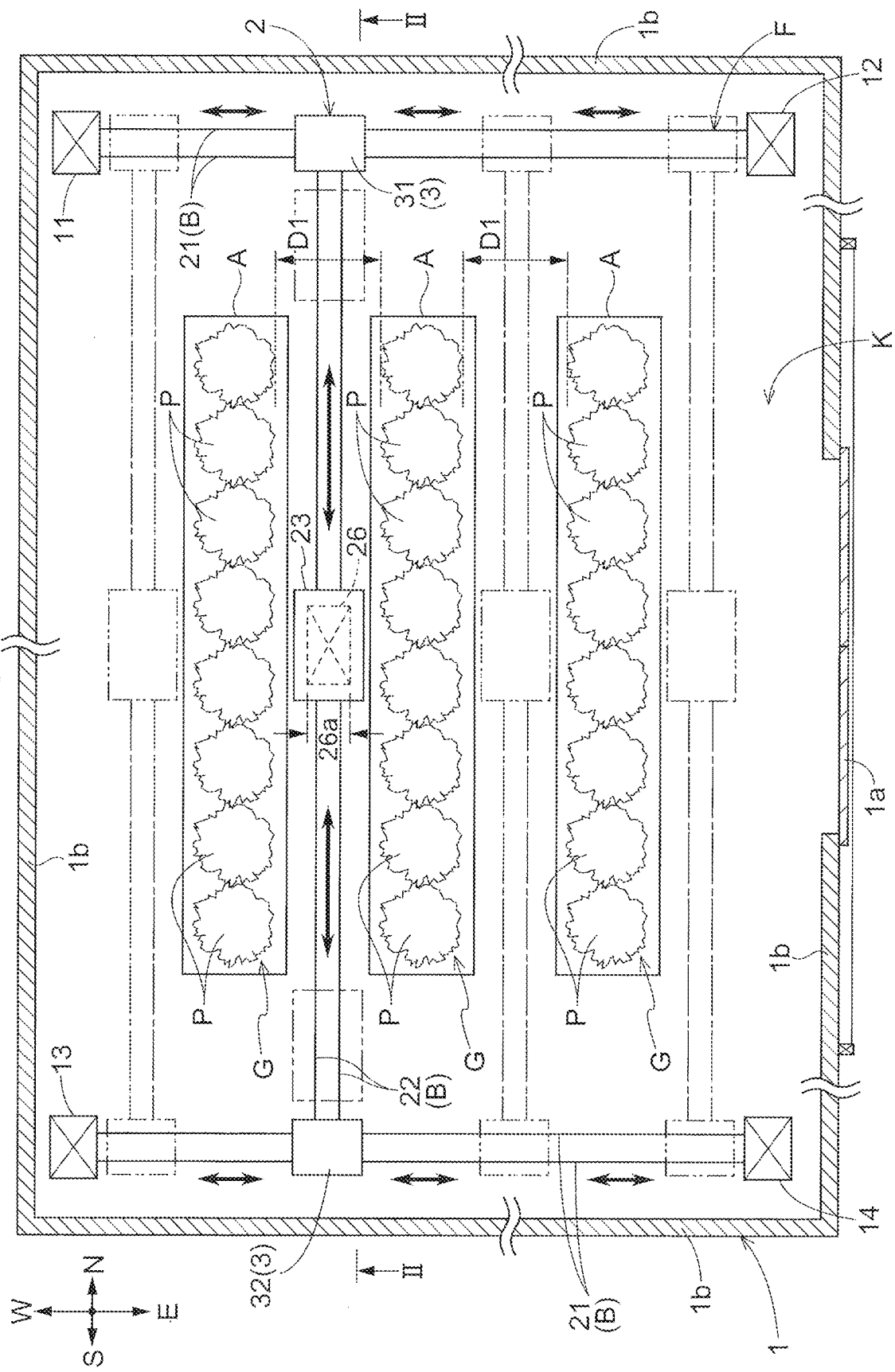
FIG. 1 is a plan view in horizontal section of a horticultural/agricultural facility.
Figure 2:
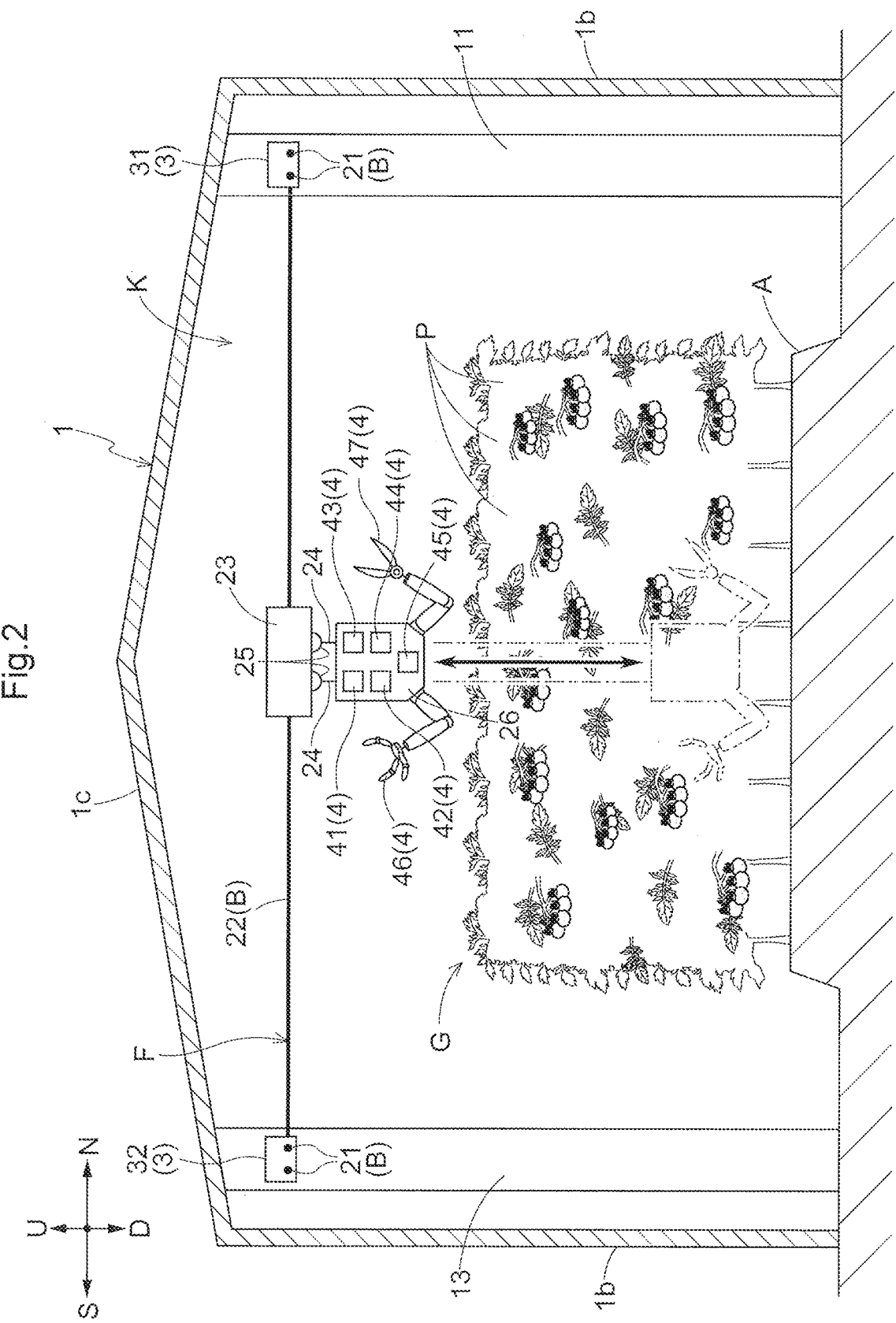
FIG. 2 is a section view taken along II-II line in FIG. 1.

Example embodiments of the present invention will be explained with reference to the accompanying drawings. Unless explicitly noted otherwise, the direction of arrow N shown in FIGS. 1, 2 and 4 is defined as the "north", the direction of arrow S is defined as the "south", the direction of arrow E shown in FIG. 1 is defined as the "east", the direction of arrow W is defined as the "west", respectively. Further, the direction of arrow U shown in FIGS. 2 and 4 is defined as "up" and the direction of arrow D is defined as "down", respectively.

In the instant example embodiment, in a horticultural/agricultural facility 1 such as the one shown in FIG. 1, there are arranged a plurality of plant groups G. Each plant group G includes a plurality of cultivated plants P (corresponding to what is referred to as "objects" relating to the present invention). Further, in the horticultural/agricultural facility 1, there are provided a plurality of ridges A in/along which the cultivated plants P are to be planted. The plurality of ridges A respectively extend in the north-south direction.

And, the plurality of ridges A are juxtaposed (disposed side by side) in the east-west direction.

In each plant group G, a plurality of cultivated plants P are arranged in a row with a predetermined interval therebetween. However, example embodiments of the present invention are not limited to this. Alternatively, for instance, in the plant groups G, the plurality of cultivated plants P may be arranged in a zig-zag pattern as seen in the plan view or may be disposed with irregular interval therebetween.

The intervals between the plurality of ridges A provide passages allowing passage by a managing person of the cultivated plants P. The horticultural/agricultural facility 1 may be, e.g., a vinyl (plastic) greenhouse or a plant factory utilizing solar power, etc.

The plurality of ridges A include non-porous hydrophilic films, for instance. And, in the plurality of ridges A, tomatoes are planted as the cultivated plant P, for example.

Further, in the horticultural/agricultural facility 1, there are provided a first post 11, a second post 12, a third post 13 and a fourth post 14. As shown in FIGS. 1 and 2, each one of the first post 11, the second post 12, the third post 13 and the fourth post 14 extends from the ground surface to the ceiling of the horticultural/agricultural facility 1.

As shown in FIG. 1, the first post 11 is positioned at the north-west portion of the horticultural/agricultural facility 1. The second post 12 is positioned at the north-east portion of the horticultural/agricultural facility 1. The third post 13 is positioned at the south-west portion of the horticultural/agricultural facility 1. The fourth post 14 is positioned at the south-east portion of the horticultural/agricultural facility 1.

As shown in FIG. 1, at the east portion of the horticultural/agricultural facility 1, an entrance/exit 1a is provided. Further, though not shown, in addition to the above, in the horticultural/agricultural facility 1, there are also provided a liquid supplying system, a skylight window, a side window, a light shielding curtain, etc.

Further, as shown in FIG. 1, at the north portion, the east portion, the west portion and the south portion of the horticultural/agricultural facility 1, there are provided walls 1b. Moreover, as shown in FIG. 2, the horticultural/agricultural facility 1 includes a roof 1c. And, the roof 1c and the four walls 1b together surround a space K.

Also, as shown in FIG. 2, the cultivated plants P are transplanted to grow in the approximately perpendicular direction.

As shown in FIG. 1 and FIG. 2, the horticultural/agricultural facility 1 includes a utility work device 2. The utility work device 2 includes a support or supporting mechanism F, a translation moving section 23 (corresponding to a "horizontally moving section"), suspensions or string-like members 24 (such as strings, belts, chains, etc.), a winding device 25, a main body section 26, a vertically moving section 3 and a working section 4.

Further, in the instant example embodiment, the supporting mechanism F includes a plurality of wires B. And, the supporting mechanism F is provided in the space K surrounded by the roof 1c and the walls 1b.

As shown in FIG. 1, the plurality of wires B include a plurality of first wires 21 and a plurality of second wires 22.

And, the plurality of first wires 21 extend in the east-west direction (corresponding to a "predetermined direction"). Further, the plurality of second wires 22 extend in the south-north direction.

Namely, the plurality of wires B include the first wires 21 extending in the east-west direction as seen in a plan view and the second wires 22 extending in a direction intersecting the east-west direction as seen in the plan view.

Further, as shown in FIG. 1, the plurality of plant groups G are juxtaposed in the extending direction of the first wires 21 with predetermined intervals D1 therebetween as seen in the plan view. Namely, the horticultural/agricultural facility 1 includes the plurality of plant groups G juxtaposed in the extending direction of the first wires 21 with predetermined intervals D1 therebetween as seen in the plan view.

And, each plant group G extends in the extending direction of the second wire 22 as seen in the plan view. Namely, each plant group G extends in the direction different from the juxtaposing direction of the plurality of plant groups G.

Further, as shown in FIG. 1, the predetermined interval D1 is greater than a width 26a of the main body section 26 in the juxtaposing direction of the plurality of plant groups G.

And, the vertically moving section 3 includes a first moving section 31 and a second moving section 32. The first moving section 31 is positioned at the north portion of the horticultural/agricultural facility 1. And, the second moving section 32 is positioned at the south portion of the horticultural/agricultural facility 1.

As shown in FIG. 1, between the first post 11 and the second post 12, two first wires 21 are provided. The first moving section 31 is supported by these two first wires 21.

Further, between the third post 13 and the fourth post 14, two first wires 21 are provided. The second moving section 32 is supported by these two first wires 21.

The first moving section 31 and the second moving section 32 each includes an electric motor (not shown). The first moving section 31 and the second moving section 32 can move along the respective first wires 21 in response to driving of the respective electric motors.

With the above, the first moving section 31 and the second moving section 32 can move in the east-west direction.

Here, the first moving section 31 and the second moving section 32 are configured to move so that the respective positions thereof in the east-west direction may be same as each other. Namely, when the first moving section 31 moves in the east direction, the second moving section 32 also moves in the east direction. And, when the first moving section 31 moves in the west direction, the second moving section 32 also moves in the west direction.

With the above-described arrangement, the vertically moving section 3 is movable in the east-west direction. Namely, the vertically moving section 3 is movable in the direction perpendicular to the extending direction of each ridge A as seen in the plan view. Incidentally, the vertically moving section 3 can be stopped at a desired position within its movable range.

Further, between the first moving section 31 and the second moving section 32, two second wires 22 are provided. The translation moving section 23 is supported by these two second wires 22.

The translation moving section 23 includes an electric motor (not shown) to move the translation moving section 23 along the two second wires 22.

With the above-described arrangement, the translation moving section 23 is movable in the south-north direction. Namely, the translation moving section 23 is movable in parallel or substantially in parallel with the extending direction of each ridge A as seen in the plan view. Incidentally, the translation moving section 23 can be stopped at a desired position within its movable range.

And, as shown in FIG. 1, as the vertically moving section 3 moves in the east-west direction, the two second wires 22 also move in the east-west direction. Further, in association with this, the translation moving section 23 also moves in the east-west direction.

Namely, the vertically moving section 3, the two second wires 22 and the translation moving section 23 move altogether in the east-west direction.

With the above-described arrangements, the translation moving section 23 is movable in the south-north direction and in the east-west direction. Namely, the translation moving section 23 is movable in the horizontal direction.

Further, as shown in FIG. 2, the translation moving section 23 suspends the main body section 26 via the suspensions or string-like members 24. Thus, in association with the movement of the translation moving section 23 in the horizontal direction, the main body section 26 also moves in the horizontal direction.

Also, the main body section 26 is supported by the plurality of first wires 21 and the plurality of second wires 22 via the translation moving section 23. Namely, the main body section 26 is supported by the plurality of wires B via the translation moving section 23. In other words, the main body section 26 is supported by the supporting mechanism F via the translation moving section 23.

And, the winding device 25 effects winding and unwinding of the suspensions or string-like members 24. And, as shown in FIG. 2, when the winding device 25 winds the suspensions or string-like members 24, the main body section 26 is elevated relative to the translation moving section 23. Further, when the winding device 25 unwinds the suspensions or string-like members 24, the main body section 26 is lowered relative to the translation moving section 23.

With the above-described arrangements, the main body section 26 is movable in the perpendicular (vertical) direction. Namely, the main body section 26 is movable in the horizontal direction and in the perpendicular direction inside the space K. Incidentally, the main body section 26 can be stopped at a desired position within its movable range.

Further, the working section 4 is supported by the main body section 26. This working section 4 carries out a utility work on the cultivated plants P. Incidentally, the term "work" (or "utility work") used in the instant example embodiment means movements required by the cultivated plant P in the process of growing this cultivated plant P. In the following explanation, some specific movements or motions carried out by the working section 4 on the cultivated plants P will be illustrated. However, example embodiments of the present invention are not limited to these, and the working section 4 may be configured to carry out different movements other than those disclosed in the following discussion.

Figure 3:
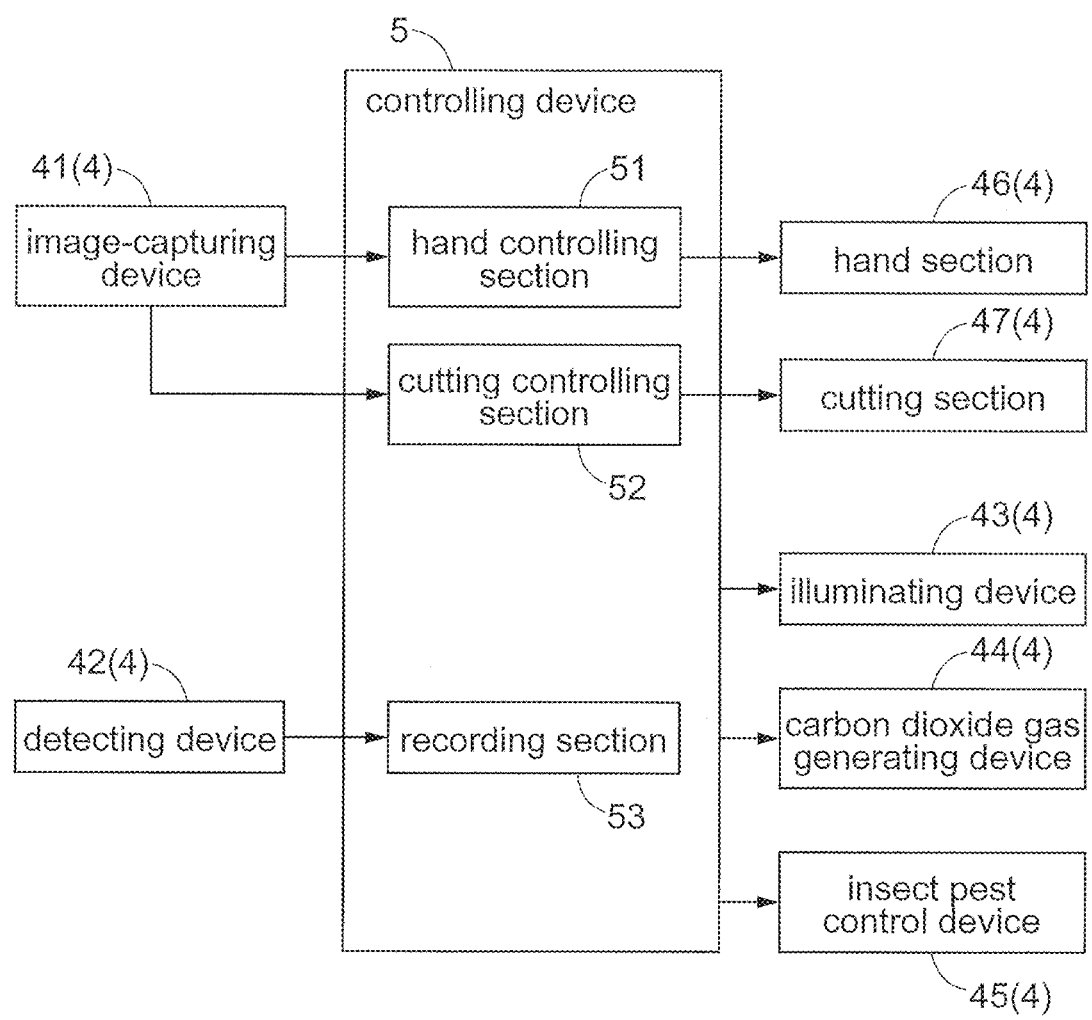
FIG. 3 is a block diagram showing arrangements relating to a controlling device.

As shown in FIG. 2 and FIG. 3, the working section 4 includes an image-capturing device 41 (corresponding to a camera), a detecting device 42, an illuminating device 43, a carbon dioxide gas generating device 44, an insect pest control device 45, a gripper or hand section 46, and a cutting section 47.

Further, as shown in FIG. 3, the utility work device 2 includes a controller or controlling device 5. This controlling device 5 includes a gripper controller or hand controlling section 51, a cutter controller or cutting controlling section 52 and a recording section 53.

The image-capturing device 41 captures an image of the cultivated plant P. With this, the image-capturing device 41 acquires a captured image of the cultivated plant P.

Incidentally, such a captured-image of the cultivated plant P includes information indicative of a state of the cultivated plant P. Namely, the image-capturing device 41 acquires information indicative of a state of a cultivated plant P.

Further, the action of image-capturing of the cultivated plant P is understood to correspond to a "work (utility work)".

As shown in FIG. 3, the captured-image acquired by the image-capturing device 41 is sent to the hand controlling section 51 and to the cutting controlling section 52.

The hand section 46 is capable of gripping the cultivated plant P. The hand controlling section 51 controls the hand section 46, based on the captured image received from the image-capturing device 41.

Namely, the hand controlling section 51 controls the hand section 46, based on the captured image acquired by the image-capturing device 41. With this, the hand section 46 can grip a leaf or a fruit of the cultivated plant P.

Incidentally, the action of such gripping of the cultivated plant P is understood to correspond to a "work (utility work)".

Further, the cutting section 47 is capable of cutting the cultivated plant P. And, the cutting controlling section 52 controls the cutting section 47 based on the captured-image received from the image-capturing device 41.

Namely, the cutting controlling section 52 controls the cutting section 47 based on the captured-image received from the image-capturing device 41. With this, the cutting section 47 can cut and eliminate unnecessary leaf or bud of the cultivated plant P.

Incidentally, the action of such cutting of the cultivated plant P is understood to correspond to a "work (utility work)".

Further, the detecting device 42 detects a state of the environment around the cultivated plant P. In the instant example embodiment, the detecting device 42 detects a temperature, a humidity, an amount of insolation, and a carbon dioxide concentration of the environment around the cultivated plant P. Incidentally, all of a temperature, a humidity, an amount of insolation, and a carbon dioxide concentration of the environment around the cultivated plant P are states of the environment around the cultivated plant P.

Incidentally, the action of such detecting of a state of the environment around the cultivated plant P corresponds to a "work (utility work)".

And, the detection result obtained by the detecting device 42 is sent to the recording section 53. The recording section 53 records the detection result received from the detecting device 42.

Further, the illuminating device 43 can irradiate light to the cultivated plant P and also to the surrounding of the cultivated plant P.

Incidentally, the action of such irradiating of light to the cultivated plant P and also to the surrounding of the cultivated plant P corresponds to a "work (utility work)".

Further, the carbon dioxide gas generating device 44 can generate carbon dioxide gas.

Incidentally, the action of such generating of carbon dioxide gas corresponds to a "work (utility work)".

Further, the insect pest control device 45 can remove harmful organisms. In the instant example embodiment, the insect pest control device 45 can effect chemical (insecticide) spraying. Further, the insect pest control device 45 can generate a sound wave and an electromagnetic wave. With this, the insect pest control device 45 can remove fungi, insects, harmful for the cultivated plant P.

Incidentally, the action of such removing of harmful organisms is understood to correspond to a "work (utility work)".

As shown in FIG. 3, the illuminating device 43, the carbon dioxide gas generating device 44, the insect pest control device 45 are controlled by the controlling device 5.

With the above-described arrangements, the main body section 26 of the utility work device 2 while being supported by the supporting mechanism F can move in the horizontal direction and the perpendicular direction. Therefore, even if the main body section 26 or the working section 4 interferes with the wall 1b or the cultivated plant P, etc., the posture of the main body section 26 will hardly be disturbed.

Therefore, with the above-described arrangements, there can be realized a utility work device 2 that can easily carry out an appropriate work.

First Alternative Example Embodiment

In the foregoing example embodiment, the supporting mechanism F preferably includes a plurality of wires B.

However, example embodiments of the present invention are not limited thereto. In the following, respecting a first alternative example embodiment relating to the present invention, an explanation will be made, focusing on those respects different from the foregoing example embodiment. The other arrangements than those explained below are same as the foregoing example embodiment. Further, as for the same arrangements as those of the foregoing example embodiment, the same reference signs will be used.

FIG. 4 is a view showing a configuration of a utility work device 2 according to the first alternative example embodiment relating to the present invention. As shown in FIG. 4, in this first alternative example embodiment, the supporting mechanism F includes a rail 27 in a horizontal posture.

The rail 27 preferably is provided between a fifth post 15 and a sixth post 16. Incidentally, the fifth post 15 and the sixth post 16 respectively extend from the ground surface to the ceiling of the horticultural/agricultural facility 1. The rail 27 is capable of supplying electric power to the main body section 26 and the working section 4.

Example embodiments of the present invention are not limited to the above. Alternatively, the rail 27 may be capable of supplying electric power only to the main body section 26 or only to the working section 4, of the main body section 26 and the working section 4.

Namely, the rail 27 is capable of supplying electric power to at least one of the main body section 26 and the working section 4.

Incidentally, supplying of electric power from the rail 27 to an object of electric power supply may be done in a wired manner or in the form of a contactless power supply.

Further, in this first alternative example embodiment, the working section 4 includes an accommodating section 48. This accommodating section 48 is box-shaped. Further, the accommodating section 48 is opened upwards and the accommodating section 48 is capable of accommodating the cultivated plant P.

More particularly, in case the cultivated plant P is a tomato plant, the accommodating section 48 can accommodate a fruit of the tomato. The utility work device 2 can harvest fruits of the tomato plant by the hand section 46 and accommodate them in the accommodating section 48.

Incidentally, the shape of the bottom portion inside the accommodating section 48 may be flat or may be a shape according to the type of the cultivated plant P. For instance, in case the cultivated plant P is a tomato plant, a plurality of recesses conforming with the outer shape of the tomato fruit may be formed in bottom portion inside the accommodating section 48.

Further, the accommodating section 48 may include a plurality of boxes that are stacked one on another. In this case, two boxes vertically adjacent each other may be connectable with each other through engagement or fitting.

As shown in FIG. 4, the accommodating section 48 is suspended from the main body section 26 via lower side suspensions or string-like members 28. Further, at the lower end portion of the main body section 26, there are provided lower side winding devices 29.

The lower side winding devices 29 effect winding and unwinding (paying out) of the lower side suspensions or string-like members 28. As shown in FIG. 4, when the lower side winding devices 29 wind the lower side suspensions or string-like members 28, the accommodating section 48 is elevated relative to the main body section 26. Also, when the lower side winding devices 29 unwind the lower side suspensions or string-like members 28, the accommodating section 48 is lowered relative to the main body section 26.

With the above, the accommodating section 48 is vertically movable relative to the main body section 26.

Further, as shown in FIG. 4, the utility work device 2 includes a physical condition information acquiring section 61 and an environment information acquiring section 62. The physical condition information acquiring section 61 and the environment information acquiring section 62 both are supported by the main body section 26.

The physical condition information acquiring section 61 can capture an image of a worker located in the surrounding of the main body section 26. Here, it is understood that a complexion and a posture of the worker are information indicative of physical conditions of the worker. Namely, the captured image obtained by the physical condition information acquiring section 61 is understood to be information indicative of a physical condition of the worker.

Namely, the physical condition information acquiring section 61 acquires information indicative of a physical condition of a worker present in the surrounding of the main body section 26.

Incidentally, example embodiments of the present invention is not limited to the above. Alternatively, the physical condition information acquiring section 61 may be configured to acquire a voice or a body temperature of the worker. It is understood that such voice and body temperature of the worker are also information indicative of physical condition of the worker.

The environment information acquiring section 62 detects a temperature, a humidity, an amount of insolation, and a carbon dioxide concentration inside the space K. With this, the environment information acquiring section 62 acquires a temperature, a humidity, an amount of insolation, and a carbon dioxide concentration inside the space K.

Incidentally, it is understood that all of a temperature, a humidity, an amount of insolation, and a carbon dioxide concentration inside the space K are information indicative of the environment inside the space K.

Namely, the environment information acquiring section 62 acquires information indicative of the environment inside the space K.

And, the utility work device 2 is capable of issuing an alarm, based on the information acquired by the physical condition information acquiring section 61 and the environment information acquiring section 62. For instance, in case the information acquired by the physical condition information acquiring section 61 indicates a poor physical condition of the worker, the utility work device 2 will issue an alarm to the surrounding via a sound or light. Incidentally, in this, the utility work device 2 may transmit a signal indicative of the poor physical condition of the worker to a management facility located outside the horticultural/agricultural facility 1.

Further, in case the information acquired by the environment information acquiring section 62 indicates a poor environment inside the space K, the utility work device 2 will issue an alarm to the surrounding via a sound or light. Incidentally, in this, the utility work device 2 may transmit a signal indicative of the poor environment inside the space K, to the management facility located outside the horticultural/agricultural facility 1.

Incidentally, the respective example embodiments described above are merely exemplary. The present invention is not limited thereto, but various modifications are possible as needed.

Other Example Embodiments (1) The east, west, south and north directions are not limited to the above example embodiments, but various modifications are possible as needed. For instance, the extending direction of the respective ridge A may be the east-west direction. Further, for example, the extending direction of the first wires 21 and the juxtaposing direction of the plurality of plant groups G as seen in the plan view may be the south-north direction. Moreover, for instance, the extending direction of the second wire 22 and the extending direction of the respective plant group G as seen in the plan view may be the east-west direction. Further, the directions of the east, west, south and north in the description of example embodiments of the present invention are only examples for the sake of explanation. The directions of the east, west, south and north in the description of example embodiments of the present invention are not limited to the directions in the description of the example embodiments. Even when the directions of the east, west, south and north are different from those in the description of example embodiments of the present invention, it will be preferred that the relative relations among the extending direction of the first wire 21, the extending direction of the second wire 22, the juxtaposing direction of the plurality of plant groups G and the extending direction of the respective plant group G be same as those described in the example embodiments.

(2) The number of the first wires 21 in the horticultural/agricultural facility 1 may be any number greater than one.

(3) The number of the second wires 22 in the horticultural/agricultural facility 1 may be any number greater than one.

(4) The working section 4 may include a monitoring device for monitoring the cultivated plant P. Incidentally, such monitoring of the cultivated plant P is understood to correspond to a "work (utility work)".

(5) The insect pest control device 45 may be omitted.
(6) The carbon dioxide gas generating device 44 may be omitted.
(7) The illuminating device 43 may be omitted.
(8) The detecting device 42 may be omitted.
(9) The recording section 53 may be omitted.
(10) The cutting section 47 may be omitted.
(11) The cutting controlling section 52 may be omitted.
(12) The hand section 46 may be omitted.
(13) The hand controlling section 51 may be omitted.
(14) The image-capturing device 41 may be omitted.
(15) The image-capturing device 41 may be a camera for image-capturing visible light or may be an infrared camera.

(16) The working section 4 may include a determining device for detecting a state of the cultivated plant P through ultrasonic or contact type determination technique. In this case, such determining device is understood to correspond to the "object information acquirer".

(17) The vertically moving section 3 and the translation moving section 23 may be omitted. In this case, as seen in the plan view, the plurality of wires B may be arranged to extend radially from the main body section 26 toward the first post 11, the second post 12, the third post 13 and the fourth post 14, respectively. Further, the main body section 26 may be configured to be movable in the horizontal direction and the perpendicular direction, in association with winding and unwinding of the plurality of wires B.

(18) The utility work device 2 may be provided at any location other than the horticultural/agricultural facility 1. For instance, the utility work device 2 may be provided in a factory which manufactures industrial products and may be configured to carry out a work on parts via the working section 4 in its manufacturing line. In this case, such parts are understood to correspond to the "objects" relating to example embodiments of the present invention.

Further, for instance, the utility work device 2 may be provided in a logistics center and may be configured to carry out a work on an object by its working section 4. In this case, such object is understood to correspond to the "object".

(19) In case the supporting mechanism F includes the rail 27 under the horizontal posture, the accommodating section 48 may be omitted.

(20) In case the supporting mechanism F includes a plurality of wires B, the accommodating section 48 may be provided.

(21) The physical condition information acquiring section 61 and the environment information acquiring section 62 may be included in the working section 4 or may not be included in the working section 4.

(22) The image-capturing device 41 may be configured to acquire information indicative of the physical condition of the worker present around the main body section 26.

(23) The detecting device 42 may be configured to acquire information indicative of the environment inside the space K.

(24) The ridges A may be omitted. Even if the ridges A are omitted, it is still possible to arrange the plurality of plant groups G and the plurality of cultivated plants P as disclosed in the foregoing example embodiments.

Example embodiments of the present invention are applicable to utility work devices each including a working section to perform a utility work on an object.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A utility work device comprising:
a main body section supported by a support; and
a working section supported by the main body section to perform a work on an object; wherein
the main body section is movable in a horizontal direction and a perpendicular direction;
the working section includes an accommodating section capable of accommodating the object;
the accommodating section is opened upwards;
the accommodating section is suspended from the main body section and vertically movable relative to the main body section; and
the object includes a fruit of a cultivated plant.

2. The utility work device of claim 1, wherein the support includes a plurality of wires including a first wire extending in a predetermined direction as seen in a plan view and a second wire extending in a direction intersecting the predetermined direction as seen in the plan view.

3. The utility work device of claim 1, wherein the support includes a rail in a horizontal posture.

4. The utility work device of claim 3, wherein the rail is capable of supplying electric power to at least either one of the main body section and the working section.

5. The utility work device of claim 1, wherein
the main body section is supported by the support via a horizontally moving section movable in the horizontal direction;
the horizontally moving section suspends the main body section via a suspension;
there is provided a winding device to wind and unwind the suspension;
as the winding device winds the suspension, the main body section is elevated relative to the horizontally moving section; and
as the winding device unwinds the suspension, the main body section is lowered relative to the horizontally moving section.

6. The utility work device of claim 1, wherein the working section includes an object information acquirer to acquire information indicative of a state of the object.

7. The utility work device of claim 6, wherein the object information acquirer includes a camera to photograph the object.

8. The utility work device of claim 7, wherein
the working section includes a gripper to grip the object; and
there is provided a gripper controller to control the gripper based on an image acquired by the camera.

9. The utility work device of claim 7, wherein
the working section includes a cutter to cut the object; and
there is provided a cutter controller to control the cutter based on an image acquired by the camera.

10. The utility work device of claim 1, wherein the working section includes a detector to detect a state of an environment around the object.

11. The utility work device of claim 1, wherein the working section includes an illuminator.

12. The utility work device of claim 1, wherein the working section includes a carbon dioxide gas generator.

13. The utility work device of claim 1, wherein the working section includes an insect pest controller to control harmful organisms.

14. The utility work device of claim 1, wherein there is provided a physical condition information acquirer supported by the main body section to acquire information indicative of a physical condition of a worker present around the main body section.

15. The utility work device of claim 1, wherein
the support is provided in a space surrounded by a roof and a wall;
the main body section is movable in the horizontal direction and the perpendicular direction within the space; and
there is provided an environment information acquirer supported by the main body section to acquire information indicative of the environment inside the space.

16. A horticultural/agricultural facility comprising the utility work device of claim 1, wherein
the object further includes the cultivated plant;
there are provided a plurality of groups of plants juxtaposed with a predetermined interval therebetween; and
each of the plurality of groups of plants includes a plurality of the cultivated plants and extends in a direction different from the juxtaposing direction of the plurality of the plant groups.

17. A horticultural/agricultural facility comprising the utility work device of claim 2:
the object further includes the cultivated plant;
there are provided a plurality of groups of plants juxtaposed with a predetermined interval therebetween in the extending direction of the first wire as seen in a plan view; and
each of the plurality of groups of plants includes a plurality of the cultivated plants and extends in the extending direction of the second wire as in seen in the plan view.

18. The horticultural/agricultural facility of claim 16, wherein the cultivated plant is transplanted to grow in an approximately perpendicular direction.

19. The horticultural/agricultural facility of claim 16, wherein the predetermined interval is greater than a width of the main body section in the juxtaposing direction of the plurality of plant groups.

20. A utility work device comprising:
a main body section supported by a support provided in a space surrounded by a roof and a wall;
a working section supported by the main body section to perform a work on an object;
a physical condition information acquirer supported by the main body section to acquire information indicative of a physical condition of a worker present around the main body section; and
an environment information acquirer supported by the main body section to acquire information indicative of the environment inside the space; wherein
the main body section is movable in a horizontal direction and a perpendicular direction; and
the physical condition information acquirer and the environment information acquirer are arranged separately about the main body section in the horizontal direction.

* * * * *